(12) United States Patent
Murray et al.

(10) Patent No.: US 6,476,885 B1
(45) Date of Patent: *Nov. 5, 2002

(54) STRESS-FREE SOCKETED OPTICAL DISPLAY PACKAGE WITH DIE NON-RIGIDLY ATTACHED TO CONTAINMENT STRUCTURE

(75) Inventors: G. Cade Murray, Fremont, CA (US); Ranjan J. Mathew, San Jose, CA (US)

(73) Assignee: National Semiconductor Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/356,482

(22) Filed: Jul. 19, 1999

(51) Int. Cl.[7] .................... G02F 1/1333; G02F 1/1345
(52) U.S. Cl. .......................... 349/60; 349/150
(58) Field of Search ................ 349/58, 60, 149, 349/150, 151, 152

(56) References Cited

U.S. PATENT DOCUMENTS

| | | | | |
|---|---|---|---|---|
| 3,914,021 A | * | 10/1975 | Nishimura | 350/160 |
| 3,922,051 A | * | 11/1975 | Reynolds | 339/17 |
| 4,534,222 A | * | 8/1985 | Finch et al. | 73/653 |
| 4,850,685 A | * | 7/1989 | Kamakura et al. | 350/397 |
| 4,958,911 A | * | 9/1990 | Beiswenger et al. | 350/331 |
| 5,150,231 A | * | 9/1992 | Iwamoto et al. | 359/44 |
| 5,233,502 A | * | 8/1993 | Beatty et al. | 361/729 |
| 5,468,994 A | * | 11/1995 | Pendse | 257/693 |
| 5,694,190 A | * | 12/1997 | Matsumoto et al. | 349/151 |
| 5,838,401 A | * | 11/1998 | Uehara | 349/58 |
| 5,880,795 A | * | 3/1999 | Nagata et al. | 349/58 |
| 5,969,783 A | * | 10/1999 | Takiar et al. | 349/150 |
| 6,025,893 A | * | 2/2000 | Kadowaki et al. | 349/58 |
| 6,356,334 B1 | * | 3/2002 | Mathew et al. | 349/153 |

FOREIGN PATENT DOCUMENTS

JP 05165013 A * 6/1993 ......... G02F/1/1333

* cited by examiner

*Primary Examiner*—Toan Ton
*Assistant Examiner*—Andrew Schechter
(74) *Attorney, Agent, or Firm*—Beyer Weaver & Thomas, LLP

(57) ABSTRACT

A liquid crystal display package including a liquid crystal cell having a die with a pixel array, and a transparent plate attached to the die. A liquid crystal material is disposed in a gap region between the die and the transparent plate. The display assembly further includes a containment structure adapted to couple to and at least partially receive liquid crystal cell therein, and an electrical connector portion integrated with the containment structure. A plurality of conductive contacts are positioned in the containment structure for secured support thereof, and in substantially stress-free electrical connection with the pixel array. The conductive contacts further are configured to releasably couple to mating conductive contacts of an opposed electrical connector.

59 Claims, 3 Drawing Sheets

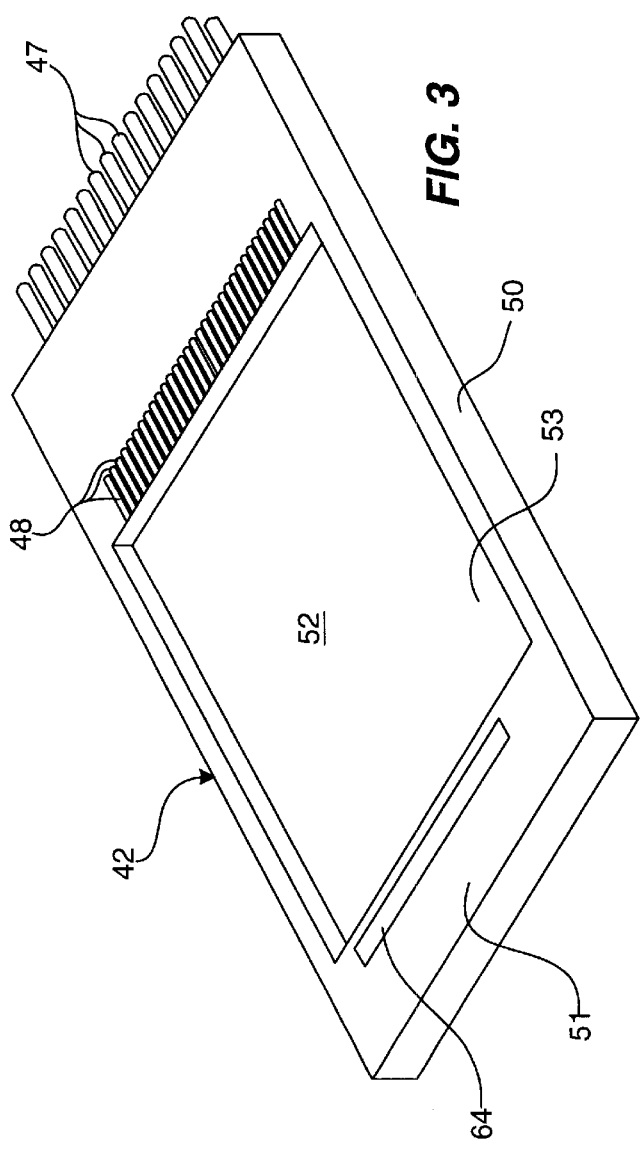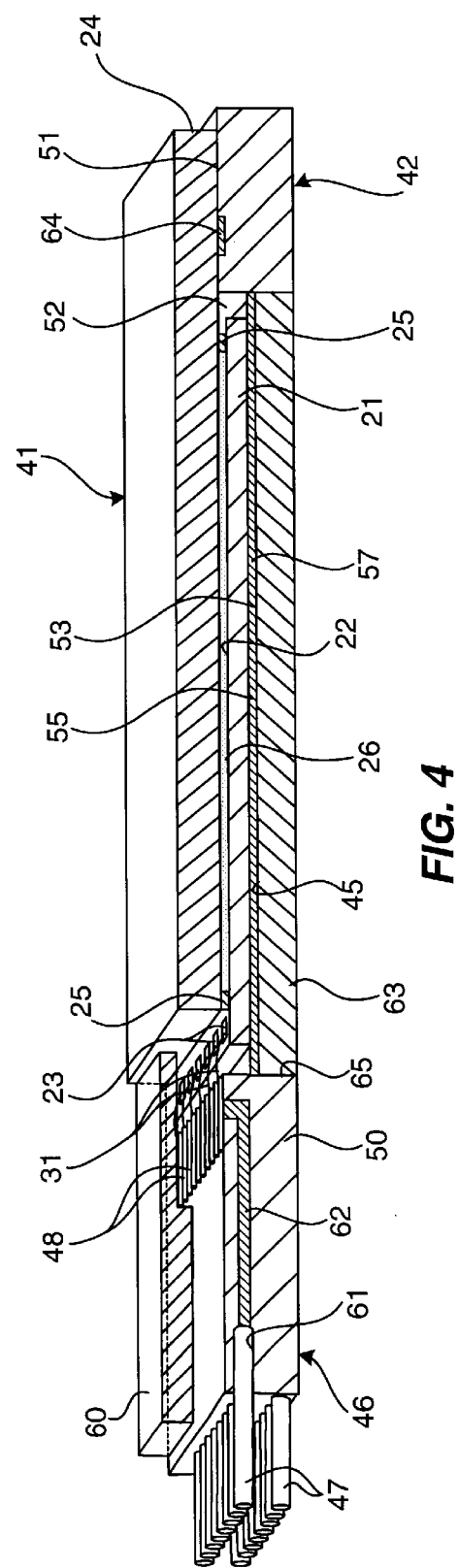

STRESS-FREE SOCKETED OPTICAL DISPLAY PACKAGE WITH DIE NON-RIGIDLY ATTACHED TO CONTAINMENT STRUCTURE

TECHNICAL FIELD

The present invention relates, generally, to liquid crystal display assemblies and, more particularly, relates to miniature liquid crystal display assemblies constructed to reduce residual stresses.

BACKGROUND ART

In the recent past, substantial research and development resources have been directed toward small scale Liquid Crystal Display (LCD) and light valve technologies. These high information content, miniature LCD assemblies enable enhanced availability of graphics, data and video information for employment in high resolution projection displays, such as a reflective LCD projectors, SXGA formats (1,280× 1,024 pixel resolution) and even HDTV formats (above 1,000 line resolution), or the like.

Reflective LCD projectors, in particular, are highly desirable since they offer the brightness of traditional three-lamp front-projection systems in combination with the high resolution of an LCD panel. At the heart of these optical engines is reflective liquid crystal on crystalline silicon light valve technology which, when combined with sophisticated optical architecture and the appropriate electronic interface, enables very high resolution, high brightness, large screen displays.

Briefly, as shown in FIGS. 1 and 2, these light valves or small scale LCD assemblies 20 include a die 21 having a pixel array 22 which is generally composed of rows and columns of electrically conductive pathways each forming an individual pixel (not shown). Each pixel can be individually changed to an "on" condition by selecting the appropriate row and column of pixel array 22. Positioned around or concentrated on one end of the pixel array are a plurality of die bond pads 23 which are internally connected to the pixel array 22 to enable operational control thereof. Selection of the appropriate pixel is controlled by control circuitry, either included within the die 21 or external to the die 21. In either configuration, external control signals may be used to control the functions of the die 21.

A transparent glass plate 24 is typically placed over the die 21 and the pixel array 22, such that a portion of the glass plate 24 overhangs the die 21. The glass plate 24 is usually affixed to die 21 through an adhesive seal 25 which together cooperate to define a sealed volume encompassing the pixel array 22. This sealed volume is then commonly filled with a solution 26 of Twisted Nematic Liquid Crystals (TNLC). The LCD package is completed by rigidly or semi-rigidly mounting the die 21 to a substrate material 27 (e.g., ceramic, metal, plastic, silicon, polyamide, or other substrate materials) for mounting support and heat conductive dissipation for the die.

One problem associated with these LCD panels assemblies is bowing or warpage of individual panels caused by residual stresses acting upon the components during operation. This is particularly noticeable in reflective-type LCD panels which have increased flatness requirements due to the nature of the reflective surface of the die. For example, thermal expansion characteristics, as well as lattice mismatching, can generate significant stresses in the underlying substrate material, therein causing significant bowing of the mirrored surface. The bowing, which translates to a non-planarity of the surface, causes both (1) a non-uniform thickness of the liquid crystal layer between the bowed reflective surface and the planar transmissive top layer, and (2) variations in the path length of the reflected light from different parts of the element, and of the array. These effects compromise the electro-optic properties of the elements and/or array.

Some of these problems have been recently addressed by minimizing or isolating the coupling between the die 21, the transparent plate 24 and the underlying substrate material 27. In effect, the panels are sufficiently isolated from one another so that the transfer of residual stresses therebetween are minimized. Typical of these application may be found in our U.S. patent application Ser. Nos.: 09/130,631, filed Aug. 6, 1998; 09/256,702, filed Feb. 24, 1999; and 09/281,758, filed Mar. 30, 1999, each herein incorporated by reference in their entirety.

Another problem associated with these small scale LCD or light valve assemblies 20 is the formation of an electrical connection with an electrical interface (not shown) for operation thereof. Typically, direct electrical connections to the die bond pads 23 of the die 21 are unacceptable since a significant amount of mechanical stress would be imparted upon its display unit by the electrical connector of the electronic interface. To address this situation, the electrical interconnection is performed through a flex circuit 29 mounted to the substrate, and which functions as an isolatory buffer. As viewed in FIGS. 1 and 2, the flex circuit 29 includes a plurality of flex circuit bond pads 30 which are typically wire bonded to the die bond pads 23 through bonding wires 31. More recently, a distal ringed coupling portion 32 of flex circuit 29 is adhesively or fixedly mounted to the top surface of substrate 27 for support thereof. Finally, a glob coating 33 is applied to die 21, substrate 27 and the distal end of flex circuit 29. The glob coating 33 (FIG. 2) further normally encapsulates the bonding wires 31 and the die and flex circuit bond pads 23 and 30 without obscuring a view of the pixel array 22 through the glass plate 24.

While this approach is advantageous in several respects, namely, providing a relatively stress-free electrical connection between the die 21 and the electrical interface, the flex circuit 29 poses numerous manufacturing challenges. For instance, the flex circuit 29 is often mounted to the substrate 27 in the early stage of the component assembly. Although one end of the flex circuit is secured to the LCD package, the other end is free to move and is often in excess of five inches. Handling of this combination, thus, becomes substantially more cumbersome and difficult to control during subsequent manufacture. Specially designed palates and assembly fixtures have been developed, which are longer than standard automated fixtures, to secure the package and flex circuit tail for automated manufacture. Accordingly, the tooling costs are increased due to their specific use, while at the same time requiring a larger amount of manufacture space.

Moreover, the flex circuit 29 itself is relatively costly to implement, and difficult to handle. During manufacture, several additional assembly steps are required to adhere the flex circuit 29 to the substrate 27.

Accordingly, there is a need to electrically connect an small scale LCD assembly to an electrical interface which minimizes residual stress induced upon the cell, as well as reduce the complexity and costs of assembly.

DISCLOSURE OF INVENTION

The present invention provides a liquid crystal display package including a liquid crystal cell having a die with a pixel array, and a transparent plate attached to the die. A liquid crystal material is disposed in a gap region between the die and the transparent plate. The display assembly further includes a containment structure adapted to couple to and at least partially receive liquid crystal cell therein, and an electrical connector portion integrated with the containment structure. A plurality of conductive contacts are positioned in the containment structure for secured support thereof, and in substantially stress-free electrical connection with the pixel array. The conductive contacts further are configured to releasably couple to mating conductive contacts of an opposed electrical connector.

In one embodiment, the die includes a plurality of die bond pads in electrical communication with the pixel array, and the substrate includes a plurality of substrate bond pads in electrical communication with the conductive contacts. The substrate includes a plurality of integrally formed circuits electrically coupling respective substrate bond pads to respective conductive contacts. Each conductive contacts includes a pin portion extending outwardly from the containment structure which is formed for mating cooperation with a respective mating conductive contact of the opposed electrical connector.

In another aspect, the containment structure includes a substrate defining a cavity which is formed and dimensioned for at least partial receipt of the liquid crystal cell therein. A support material is included between the liquid crystal cell and the containment structure to support the liquid crystal cell in a floating manner within the containment structure.

In yet another embodiment, the display assembly includes a plurality of spaced apart stabilizers arranged to couple edge portions of the liquid crystal cell to the containment structure without adhering a bottom surface of the liquid crystal cell to a bottom surface of the containment structure. These stabilizers are sufficiently compliant such substantial stresses are not induced in the LCD assembly.

In another aspect of the present invention, a support substrate device is provided for use with a liquid crystal cell which includes a die and a transparent plate attached to the die. The dies includes a pixel array, and a plurality of die bond pads in electrical communication with the pixel array. The substrate device includes a substrate member defining a cavity formed and dimensioned for at least partial receipt of the liquid crystal cell therein. A plurality of substrate bond pads are positioned along a surface of the substrate member. The substrate bond pads are electrically coupled to respective die bond pads of the liquid crystal cell. The support substrate device of the present invention further includes a plurality of conductive contacts each positioned in the substrate member for secured support thereof. Moreover, each conductive contact is configured to releasably couple to mating conductive contacts of an opposed electrical connector. A plurality of circuit members are disposed in the substrate member in a manner electrically connecting respective substrate bond pads to respective conductive contacts.

BRIEF DESCRIPTION OF THE DRAWING

The assembly of the present invention has other objects and features of advantage which will be more readily apparent from the following description of the best mode of carrying out the invention and the appended claims, when taken in conjunction with the accompanying drawing, in which:

FIG. 3 is a top perspective view of a containment structure constructed in accordance with the present invention.

FIG. 4 is an enlarged top perspective view, in cross-section, of the LCD assembly of the present invention, illustrating the internal circuitry.

BEST MODE OF CARRYING OUT THE INVENTION

Figure 1:
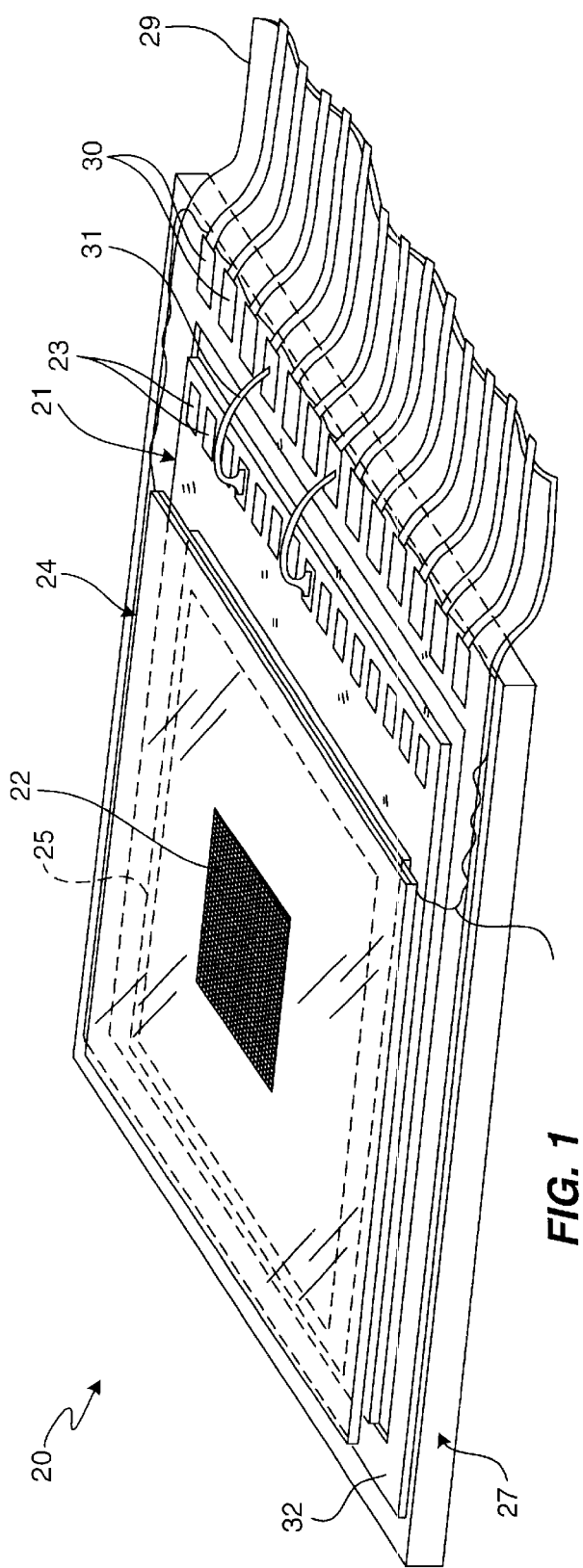
FIG. 1 is a top perspective view of a current Liquid Crystal Display (LCD) assembly illustrating a flex circuit mounted to a substrate.
Figure 2:
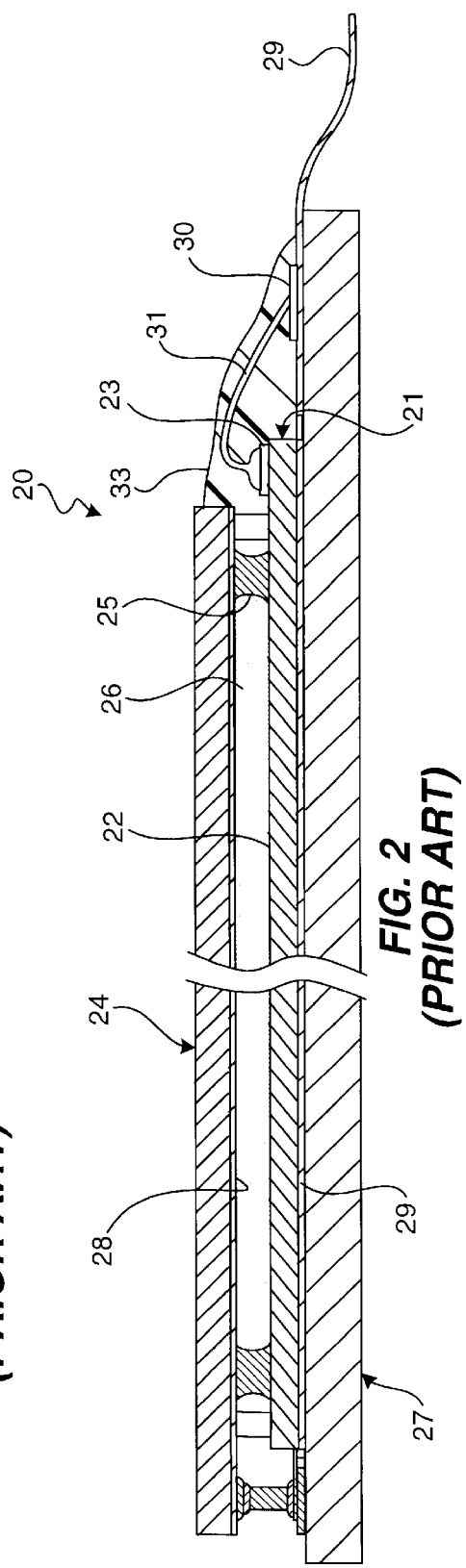
FIG. 2 is an enlarged, fragmentary, side elevation view, in cross-section, of the LCD assembly of FIG. 1.

While the present invention will be described with reference to a few specific embodiments, the description is illustrative of the invention and is not to be construed as limiting the invention. Various modifications to the present invention can be made to the preferred embodiments by those skilled in the art without departing from the true spirit and scope of the invention as defined by the appended claims. It will be noted here that for a better understanding, like components are designated by like reference numerals throughout the various figures.

Attention is now directed to FIGS. 3 and 4 where a Liquid Crystal Display package or assembly, generally designated 40, is illustrated including a liquid crystal cell 41 and a containment structure 42. The liquid crystal cell 41 includes a die 21 having a pixel array 22, and a transparent plate 24 attached to the die 21. A liquid crystal material 26 is disposed in a gap region 45 between the die 21 and the transparent plate 24. The containment structure 42 is adapted to at least partially receive liquid crystal cell 41 therein. An electrical connector portion 46 is integrally formed with the containment structure 42 which includes a plurality of conductive contacts 47 positioned in the containment structure 42 for secured support thereof, and in substantially stress-free electrical connection with the pixel array 22. The conductive contacts 47 are further configured to releasably couple to the mating conductive contacts of a mating electrical connector (not shown).

Accordingly, an LCD package assembly is provided having an electrical connector assembly integrally formed with the containment structure. This arrangement, thus, enables an electrical connection between the display of the liquid crystal cell and an electrical interface (e.g., a circuit board or a CPU card) through a conventional cable-type electrical connector without the transfer of mechanically induced stresses to the cell. Hence, the residual stress induced optical defects, including variations in color uniformity and fringes, and optical shadows may therefore be substantially minimized. Moreover, the costly flex circuit-type electrical connectors of the current designs can be eliminated which reduce costs, as well as simplify manufacture since the cumbersome tail portion of the flex circuit would be eliminated. The LCD package assemblies of the present invention, therefore, may now be secured to standard automation fixtures during manufacture, such as conventional package handlers and automation.

Figure 5:
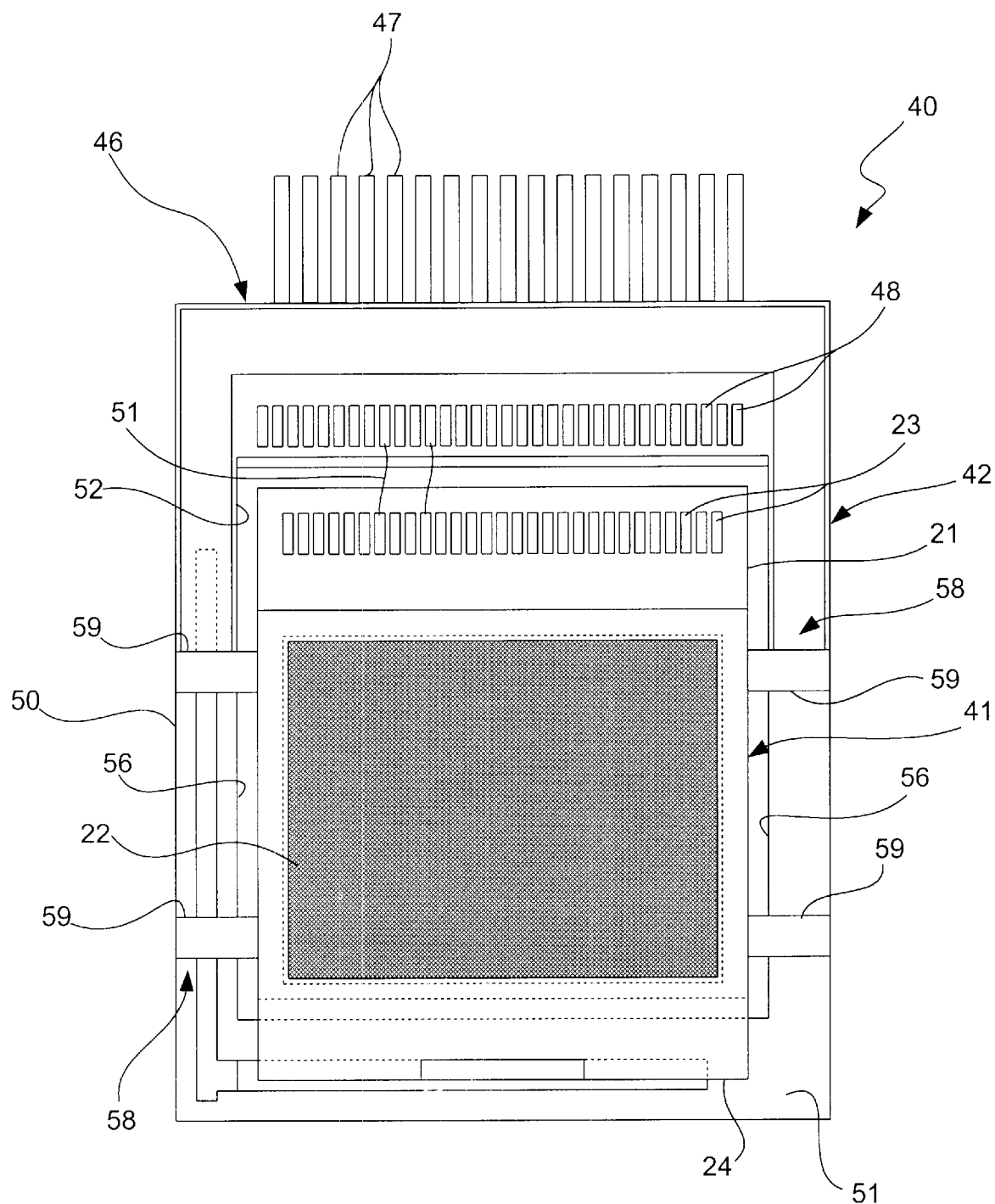
FIG. 5 is a top plan view of the LCD assembly of FIG. 4.

As best viewed in FIGS. 4 and 5, the Liquid Crystal Display (LCD) device 41 (i.e., the liquid crystal cell) and the containment structure 42 together form the LCD assembly 40 which may be plugged directly into a corresponding mating electrical socket. The display device 41 includes a die 21 having a pixel array 22, and a transparent plate 24 positioned over and adjacent to the die 21. An adhesive seal 25 adhesively couples the die 21 to the transparent plate 24. The adhesive seal 25 together with the transparent plate 24 and the die 21 cooperate to define a sealed volume therebetween encompassing the pixel array 22. A liquid crystal material 26 is disposed within the sealed volume. Preferably, these liquid crystals 26 are Twisted Nematic Liquid Crystals. Other types of liquid crystals, however, may be utilized in accordance with the present invention.

The transparent plate 24 may be composed of any suitable material such as glass or plastic, or the like, which provides substantial rigidity to the display device 41. While the transparent plate 24 is preferably rectangular, it will be understood that the peripheral shape thereof may be any geometric shape sufficient to cover the pixel array 22 of the die 21, while further sufficiently mounting to the display device 41 to the containment structure 42. A conductive coating (not shown) is preferably applied to the undersurface 28 of the plate 24, such as indium-tin oxide, to enhance electrical conductivity. This coating is a transparent conductive medium which enables a constant charge to be applied to the transparent plate or glass. The indium-tin oxide coating is preferably about $2.0$–$6.0 \times 10^{-6}$ in. thick and is capable of electrically supporting indium based solders or epoxies, or the like.

A plurality of die bond pads 23 are preferably disposed on one side of the silicon die 21, although they may be disposed along multiple sides, which are electrically coupled to pixel array 22 through internal circuitry (not shown). As will be described in greater detail below, these die bond pads 23 are electrically coupled to corresponding substrate bond pads 48 of the containment structure, which in turn are electrically coupled to the electronic interface to facilitate control of the pixel array.

In accordance with the present invention, the containment structure 42 includes a substrate 50 which is configured to cooperate with the display device 41 such that the die 21 is substantially insulated from transmission of residual stresses induced by or acting upon the substrate 50. This is preferably performed, as shown in FIGS. 4 and 5, by configuring the attachment of the support substrate 50 to the die 21 in a relatively non-rigid or semi-rigid manner. Accordingly, residual stresses induced by or acting upon the substrate will not be transmitted directly to the die of the display device. Stress induced optical distortions, and transparent plate delamination, are therefore significantly reduced. In another aspect, the substrate is composed of a relatively rigid mechanical material, such as plastic, ceramic, metal, epoxy/glass composite, or the like. More preferably, the substrate is composed of a relatively rigid material which has a relatively low Coefficient of Thermal Expansion that is closely matched to that of the Liquid Crystal Cell (typically about 3–4 PPM/Deg). For example, these materials may include Liquid Crystal polymer plastic, Alumina Nitride Ceramic, or Alloy 42, etc.

Preferably, the top surface 51 of the containment structure 42 defines a cavity 52 which is dimensioned for receipt of the die 21 therein upon rigid or semi-rigid mounting of the transparent plate 24 to the die. FIGS. 4 and 5 illustrate that the die 21 may be mounted to the transparent plate 24 and the plate may be supportively mounted to and against the substrate 50 so that the die 21 is at least partially seated in the cavity 52. In one embodiment, the die 21 may not contact any of the interior walls defining the cavity 52 of the substrate 50. Cavity 52 is therefore dimensioned to be slightly peripherally larger than the periphery of the die 21 (FIG. 4), both of which are preferably rectangular in shape. In another embodiment, one or at most two adjacent interior walls defining the cavity 52 may be employed as a means for positioning and aligning the 21 die (and thus the cell) relative the containment structure 42.

Further, the depth of cavity 52 is sufficient for substantial non-contact between the die undersurface and the substrate such that a gap region 45 is formed between a floor 53 of the cavity 52 and the undersurface 55 of the die 21. Accordingly, since the die 21 is non-attached to the substrate, rigidly or semi-rigidly, and is preferably also in non-contact therewith, the die is essentially insulated from the residual stresses of the substrate by being suspended from the transparent plate 24 or floated on non-rigid die-attach support material underneath.

The gap region 45 formed between the die undersurface 55 and the cavity floor 53 is preferably about 0.5 mm to about 1.0 mm. Cavity 52 may be open to the surrounding air to effect radiation and convection cooling of the die during operation. Thus, air may flow into cavity 52 through a side port 56 (FIG. 5), circulate therein, and then exit through side port 56 for cooling of the die. Preferably, however, a support material 57 (FIG. 4) may be positioned in the gap region 45 between and contacting the die undersurface 55 and the cavity floor 53 for mechanical support thereof.

More preferably, the support material is composed of a thermoconductive support material which provides a conductive pathway from the die undersurface 55 into the substrate 50 of the containment structure 42 for heat dissipation thereof. Preferably, the thermoconductive support material is provided by a conventional thermoconductive grease or the like. It will be appreciated, of course, that the interdisposed thermoconductive support material 57 does not rigidly or semi-rigidly mount or affix the die 21 to the support substrate 50. Therefore, the stress induced forces are not transmitted therebetween.

To further mechanically secure and mount the display device 41 to the containment structure 42, a support structure 58 cooperates therebetween in a manner substantially insulating the display device from transmission of residual stresses induced by or acting upon the substrate 50. Preferably, as best illustrated in FIG. 5, the support substrate is provided by a plurality of spaced-apart stabilizers 59 securing the display device 41 to the containment structure 42. The stabilizers 59 are formed from an elastic material and provide the principle means of securing the display device 41 in place. With the described arrangement, the display device 41 is substantially insulated from stresses and/or warpage induced by the substrate 50. Collectively, the stabilizers 59 provide non-rigid support for the display device 41 on the substrate 50. In one embodiment, the stabilizers 59 are connected between the substrate and the sides of the transparent plate 24. Preferably, the stabilizers connect to the side of the display device 41 and not the undersurface or upper surface of the die 21 or the transparent plate 24. The stabilizers are preferably sufficiently compliant such that they do not induce detrimental stresses in the LCD assembly during subsequent construction or operation. However, they must be sufficiently stiff to prevent movement of the display device 41 within the recess. An example of this arrangement is disclosed in the above-mentioned U.S. patent application Ser. No. 09/256,702.

It will be appreciated, however, that other stress insulative securing techniques may be employed to secure the display device 41 to the containment structure 42, such as the single adhesive attachment or floating configuration disclosed in U.S. patent application Ser. No. 09/130,631, filed Aug. 6, 1998, or the suspension techniques disclosed in U.S. patent application Ser. No. 09/209,868, filed Dec. 11, 1998, both of which are incorporated by reference in their entirety.

As best viewed in FIGS. 3 and 5, substrate 50 includes a plurality of substrate bond pads 48 positioned on one end thereof. Preferably, the substrate bond pads are aligned at a proximal edge of the cavity 52 which corresponds to where the die bond pads 23 of the die 21 are preferably situated when the die 21 is seated within the cavity 52. To electrically connect the substrate bond pads 48 to the corresponding die bond pads 23, Tape Automated Bonding (TAB) may be applied (not shown). Another electrical interconnection technique, however, may be any low temperature bonding scheme which is capable of electrical connection below about 100° C. so as not to damage the liquid crystal cell. Such wire bonding schemes include, by way of example, aluminum wedge bonding, low temperature gold wedge bonding or low-temp gold-ball bonding.

In either application, a molded cap 60 (FIG. 4) or the like is to be formed or fitted around the electrical interconnection. This mechanical barrier functions to protect the TAB or wire bonds 31 and the internal elements of die 21, such as the bond pads, ground pads, and ground bond pads. In one embodiment, the molded cap 60 may be provided by a silicon glob coating which further functions as a moisture barrier as well, or may be both a glob and a rigid cap together.

In accordance with the present invention, the containment structure 42 includes an electrical connector portion 46 integrally formed therewith. As shown in FIG. 4, the electrical connector portion 46 include a plurality of conductive contacts 47 positioned in respective recesses 61 defined by the containment structure 42. Each conductive contact 47 is slideably secured to or integrally formed in the respective recess 61 of the containment structure 42 during fabrication thereof.

In the preferred embodiment, the conductive contacts 47 are provided by apart metallic pins 47 extending proximally from the proximal end of the containment structure 42. These spaced-apart pins 47 are aligned in rows and columns which correspond to respective female conductive contacts of the mating electrical connector (not shown). Accordingly, the LCD assembly can then be plugged directly into a corresponding electrical connector or socket without imparting the residual stresses acting upon the conductive contacts to the display device (i.e., due to the substantially stress-free isolation between the containment structure 42 and the display device 41.

While the conductive contacts 47 are illustrated and described as conductive pins, it will be appreciated that these contacts may be provided by female conductive contacts, conductive pads or sockets adapted to electrically mate with an opposed electrical connector. The contacts may also consist of metal pads (and possibly solder bumps) which may be soldered directly to the driver board, as in a surface-mount device or Ball Grid Array (BGA). Moreover, the contacts may be disposed along any surface of the containment structure, such as the top or bottom surface of the containment structure.

To electrically connect the conductive contacts 47 to the substrate bond pads 48, the containment structure 42 of the substrate 50 includes a plurality of integrally formed circuits 62 therebetween. These integral circuits 62 are preferably embedded in the substrate 50 during the fabrication or molding of the containment structure 42 to reduce exposure to the surrounding environment. Various conventional molding of metallization techniques may be applied to fabricate the individual circuits in the substrate 50, depending upon the material composition thereof.

To assure proper insulation to prevent shorting between the circuits 62, conductive contacts 47 and the substrate bond pads 48, at least the electrical connector portion 46 of the containment structure 42 is properly insulated. This is preferably performed by composing this portion of a non-conductive material, such as plastic or metallized ceramic. In this manner, the substrate 50 can be easily molded or fabricated, using conventional manufacturing techniques, to form and insulate the individual circuits. More preferably, the entire containment structure 42 is composed of a relatively rigid, non-conductive material In accordance with the present invention, a conductive strip or pad 64 may be included (FIGS. 3 and 4) which is positioned on the opposite distal side of cavity 52, generally parallel to the cavity distal edge. This metal strip 64 provides a ground for the transparent plate 24 which is electrically and thermally connected thereto through the conductive adhesive mount (not shown) electrically coupling the metal strip to the indium-tin oxide coating (not shown) at the bottomside of the transparent plate 24. 68 above-discussed. This strip is then electrically coupled to one of the conductive contacts 47 through a metal trace (not shown) embedded in the substrate 50 in a manner similar to the circuits 62.

Since plastic or metallized ceramic may not have sufficient conductive material properties to dissipate heat from the die during operation, a heat slug or heat sink 63 (FIG. 4) may be embedded in the substrate 50 and in conductive contact with the die 21. In this event, an opening 65 extends into the cavity 52 through a bottomside of the containment structure 42. The heat slug 63 would then be positioned in the opening, adjacent to the undersurface 55 of the die 21. During operation, the heat generated by the die would pass through the thermoconductive support material 57 and into the heat slug 63 for heat dissipation out of the bottomside thereof.

It will further be understood, however, that only the electrical connector portion 46 of the containment structure need be insulated to prevent shorting of the circuitry. Therefore, the other remaining portions of the containment structure may be composed of a more conductive material to improved rigidity and heat dissipation properties.

What is claimed is:

1. A liquid crystal display package comprising:
   a liquid crystal cell including a die having a pixel array, a transparent plate attached to the die, and a liquid crystal material disposed in a gap region between the die and the transparent plate;
   a containment structure adapted to at least partially receive liquid crystal cell therein, said liquid crystal cell being mounted to said containment structure in a manner such that said die is substantially free of adherence to said containment structure; and
   an electrical connector portion integrated with said containment structure having a plurality of conductive contacts each at least partially embedded in said containment structure for secured support thereof and in substantially stress-free electrical connection with the pixel array, said conductive contacts further being configured to releasably couple to mating conductive contacts of an opposed electrical connector.

2. The liquid crystal display package as recited in claim 1 further including:
   a support material arranged to support the liquid crystal cell in a floating manner within the containment structure.

3. The liquid crystal display package as recited in claim 2, wherein
   said support material is a thermal grease.

4. The liquid crystal display package as recited in claim 1 further including:

a plurality of spaced apart stabilizers arranged to couple edge portions of the liquid crystal cell to the containment structure without adhering a bottom surface of the liquid crystal cell to a bottom surface of the containment structure.

5. The liquid crystal display package as recited in claim 4, wherein the stabilizers are sufficiently compliant such that they do not induce substantial stresses in the LCD assembly.

6. The liquid crystal display package as recited in claim 5, wherein the plurality of stabilizers includes four spaced apart stabilizers.

7. The liquid crystal display package as recited in claim 1, wherein said containment structure includes a substrate defining a cavity formed and dimensioned for at least partial receipt of the liquid crystal cell therein.

8. The liquid crystal display package as recited in claim 7 further including:

a support material disposed in said cavity between the liquid crystal cell and the containment structure to support the liquid crystal cell in a floating manner.

9. The liquid crystal display package as recited in claim 8, wherein said support material is a thermal grease.

10. The liquid crystal display package as recited in claim 7 further including:

a heat sink positioned in said cavity having a surface conductively coupled to the liquid crystal cell for heat dissipation thereof.

11. The liquid crystal display package as recited in claim 10, wherein said heat sink is embedded in said substrate substantially adjacent a bottomside of the die.

12. The liquid crystal display package as recited in claim 11 further including:

a thermal support material disposed in said cavity between the die bottomside and the heat sink for thermal conductivity therebetween and to support the liquid crystal cell in a floating manner.

13. The liquid crystal display package as recited in claim 1, wherein said containment structure is composed of a non-conductive material.

14. The liquid crystal display package as recited in claim 13, wherein said non-conductive material includes one of plastic, ceramic, and epoxy/glass composite.

15. The liquid crystal display package as recited in claim 1, wherein said containment structure is composed of a material having a low Coefficient of Thermal Expansion substantially similar to that of the liquid crystal cell.

16. The liquid crystal display package as recited in claim 15, wherein said material includes liquid-crystal polymer plastic or alumina nitride ceramic or alloy 42.

17. The liquid crystal display package as recited in claim 1, wherein each conductive contact includes a male pin portion extending outwardly from said containment structure which is formed for mating cooperation with a respective female mating conductive contact of the opposed electrical connector.

18. The liquid crystal display package as recited in claim 1, wherein each conductive contact includes a female socket portion extending inwardly from into containment structure which is formed for mating cooperation with a respective male mating conductive contact of the opposed electrical connector.

19. The liquid crystal display package as recited in claim 1, wherein said die includes a plurality of die bond pads in electrical communication with the pixel array, said substrate includes a plurality of substrate bond pads in electrical communication with the conductive contacts.

20. The liquid crystal display package as recited in claim 19, wherein said substrate includes a plurality of integrally formed circuits electrically coupling respective substrate bond pads to respective conductive contacts.

21. The liquid crystal display package as recited in claim 19 further including:

a plurality of wirebonds or tab bonds electrically coupling respective die bond pads to respective substrate bond pads.

22. A support substrate device for use with a liquid crystal cell including a die having a pixel array, a plurality of die bond pads in electrical communication with the pixel array, and a transparent plate attached to the die, said substrate device comprising:

substrate member defining a cavity formed and dimensioned for at least partial receipt of the liquid crystal cell therein, said substrate member being adapted to mount to said liquid crystal cell in a manner such that said die is substantially non-rigidly attached to said substrate member;

a plurality of substrate bond pads positioned along a surface of said substrate member, said substrate bond pads being electrically coupled to respective die bond pads of said liquid crystal cell;

a plurality of conductive contacts each at least partially embedded in said substrate member for secured support thereof, and configured to releasably couple to mating conductive contacts of an opposed electrical connector; and a plurality of circuit members embedded in said substrate member in a manner electrically connecting respective substrate bond pads to respective conductive contacts.

23. The support substrate device as recited in claim 22 further including:

a support material arranged to support the liquid crystal cell in a floating manner within the cavity of the substrate member.

24. The support substrate device as recited in claim 23, wherein said support material is a thermal grease.

25. The support substrate device as recited in claim 22 further including:

a plurality of spaced apart stabilizers arranged to couple edge portions of the liquid crystal cell to the substrate member without adhering a bottom surface of the liquid crystal cell to a bottom surface of the substrate member.

26. The support substrate device as recited in claim 22, wherein
said substrate member is composed of a non-conductive material.

27. The support substrate device as recited in claim 26, wherein
said non-conductive material includes one of plastic, ceramic, and epoxy/glass composite.

28. The support substrate device as recited in claim 22, wherein
said substrate member is composed of a material having a low Coefficient of Thermal Expansion substantially similar to that of the liquid crystal cell.

29. The support substrate device as recited in claim 28, wherein
said material includes liquid-crystal polymer plastic or alumina nitride ceramic or alloy 42.

30. The support substrate device as recited in claim 22, wherein
each conductive contact includes a male pin portion extending outwardly from said containment structure which is formed for mating cooperation with a respective female mating conductive contact of the opposed electrical connector.

31. The support substrate device as recited in claim 22, wherein
each conductive contact includes a female socket portion extending inwardly from into containment structure which is formed for mating cooperation with a respective male mating conductive contact of the opposed electrical connector.

32. The support substrate device as recited in claim 22, wherein
said substrate bond pads are further disposed along an edge of the cavity.

33. The support substrate device as recited in claim 22 further including:
a heat sink positioned in said cavity having a surface conductively coupled to the liquid crystal cell for heat dissipation thereof.

34. The liquid crystal display package as recited in claim 33, wherein
said heat sink is embedded in said substrate substantially adjacent a bottomside of the die.

35. The liquid crystal display package as recited in claim 34 further including:
a thermal support material disposed in said cavity between the die bottomside and the heat sink for thermal conductivity therebetween and to support the liquid crystal cell in a floating manner.

36. A liquid crystal display package comprising:
a liquid crystal cell including a die having a pixel array, a transparent plate attached to the die, and a liquid crystal material disposed in a gap region between the die and the transparent plate;
a containment structure adapted to at least partially receive liquid crystal cell therein, said liquid crystal cell being mounted to said containment structure in a manner such that said die is substantially non-rigidly attached to said containment structure; and
an electrical connector portion integrated with said containment structure having a plurality of circuit portions embedded in said containment structure and associated conductive contacts each at least partially embedded in said containment structure for secured support thereof, said electrical connector portion being in substantially stress-free electrical connection with the pixel array, said conductive contacts further being configured to releasably couple to mating conductive contacts of an opposed electrical connector.

37. The liquid crystal display package as recited in claim 36, wherein
said die includes a plurality of die bond pads in electrical communication with the pixel array,
said substrate includes a plurality of substrate bond pads in electrical communication with the conductive contacts.

38. The liquid crystal display package as recited in claim 37, wherein
said substrate includes a plurality of integrally formed circuits electrically coupling respective substrate bond pads to respective conductive contacts.

39. The liquid crystal display package as recited in claim 37 further including:
a plurality of wirebonds or tab bonds electrically coupling respective die bond pads to respective substrate bond pads.

40. The liquid crystal display package as recited in claim 36, wherein
a support material arranged to support the liquid crystal cell in a floating manner within the containment structure such that the die is substantially insulated from the transmission of residual stresses from the containment structure to the die.

41. The liquid crystal display package as recited in claim 36 further including:
a plurality of spaced apart stabilizers arranged to couple edge portions of the liquid crystal cell to the containment structure without adhering a bottom surface of the liquid crystal cell to a bottom surface of the containment structure.

42. The liquid crystal display package as recited in claim 36, wherein
said containment structure includes a substrate defining a cavity formed and dimensioned for at least partial receipt of the liquid crystal cell therein.

43. The liquid crystal display package as recited in claim 42 further including:
a heat sink positioned in said cavity having a surface conductively coupled to the liquid crystal cell for heat dissipation thereof.

44. A liquid crystal display package comprising:
a liquid crystal cell including a die having a pixel array, a transparent plate attached to the die, and a liquid crystal material disposed in a gap region between the die and the transparent plate;
a containment structure adapted to at least partially receive liquid crystal cell therein, said liquid crystal cell being mounted to said containment structure in a manner such that said die is substantially non-rigidly attached to said containment structure;
an electrical connector portion integrated with said containment structure having a plurality of conductive contacts each positioned in said containment structure for secured support thereof, and in substantially stress-free electrical connection with the pixel array, said conductive contacts further being configured to releasably couple to mating conductive contacts of an opposed electrical connector; and
a plurality of spaced apart stabilizers arranged to couple edge portions of the liquid crystal cell to the substrate member without adhering a bottom surface of the die to a bottom surface of the substrate member.

45. The liquid crystal display package as recited in claim 44 further including:
   a support material arranged to support the liquid crystal cell in a floating manner within the containment structure such that the die is substantially insulated from the transmission of residual stresses from the containment structure to the die.

46. The liquid crystal display package as recited in claim 44, wherein
   said containment structure includes a substrate defining a cavity formed and dimensioned for at least partial receipt of the liquid crystal cell therein.

47. The liquid crystal display package as recited in claim 46 further including:
   a heat sink positioned in said cavity having a surface conductively coupled to the liquid crystal cell for heat dissipation thereof.

48. The liquid crystal display package as recited in claim 44, wherein
   the stabilizers are sufficiently compliant such that they do not induce substantial stresses in the LCD assembly.

49. The liquid crystal display package as recited in claim 48, wherein
   the plurality of stabilizers includes four spaced apart stabilizers.

50. A support substrate device for use with a liquid crystal cell including a die having a pixel array, a plurality of die bond pads in electrical communication with the pixel array, and a transparent plate attached to the die, said substrate device comprising:
   substrate member defining a cavity formed and dimensioned for at least partial receipt of the liquid crystal cell therein, said substrate member being adapted to mount to said liquid crystal cell in a manner such that said die is substantially non-rigidly attached to said substrate member;
   a plurality of substrate bond pads positioned along a surface of said substrate member, said substrate bond pads being electrically coupled to respective die bond pads of said liquid crystal cell;
   a plurality of conductive contacts each positioned in said substrate member for secured support thereof, and configured to releasably couple to mating conductive contacts of an opposed electrical connector;
   a plurality of circuit members in said substrate member in a manner electrically connecting respective substrate bond pads to respective conductive contacts; and
   a plurality of spaced apart stabilizers arranged to couple edge portions of the liquid crystal cell to the substrate member without adhering a bottom surface of the die to a bottom surface of the substrate member.

51. The support substrate device as recited in claim 50 further including:
   a support material arranged to support the liquid crystal cell in a floating manner within the containment structure such that the die is substantially insulated from the transmission of residual stresses from the containment structure to the die.

52. The support substrate device as recited in claim 51, wherein
   said support material is a thermal grease.

53. The support substrate device as recited in claim 50, wherein
   said substrate member is composed of a non-conductive material.

54. The support substrate device as recited in claim 50 further including:
   a heat sink positioned in said cavity having a surface conductively coupled to the liquid crystal cell for heat dissipation thereof.

55. The support substrate device as recited in claim 54, wherein
   said heat sink is embedded in said substrate substantially adjacent a bottomside of the die.

56. The support substrate device as recited in claim 50 further including:
   a support material arranged to support the liquid crystal cell in a floating manner within the cavity of the substrate member.

57. The support substrate device as recited in claim 56, wherein
   said support material is a thermal grease.

58. The support substrate device as recited in claim 50, wherein
   the stabilizers are sufficiently compliant such that they do not induce substantial stresses in the LCD assembly.

59. The support substrate device as recited in claim 58, wherein
   the plurality of stabilizers includes four spaced apart stabilizers.

* * * * *